(12) United States Patent
Matsumoto

(10) Patent No.: US 11,250,879 B1
(45) Date of Patent: Feb. 15, 2022

(54) HEAT-ASSISTED MAGNETIC RECORDING (HAMR) HEAD WITH OPTICALLY REFLECTIVE SHIELD MATERIAL ADJACENT THE WAVEGUIDE

(71) Applicant: Western Digital Technologies, Inc., San Jose, CA (US)

(72) Inventor: Takuya Matsumoto, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/177,292

(22) Filed: Feb. 17, 2021

(51) Int. Cl.
G11B 11/105 (2006.01)
G11B 5/60 (2006.01)
G11B 5/39 (2006.01)
G11B 5/48 (2006.01)
G11B 5/00 (2006.01)

(52) U.S. Cl.
CPC .......... G11B 5/6088 (2013.01); G11B 5/3912 (2013.01); G11B 5/4866 (2013.01); G11B 2005/0021 (2013.01)

(58) Field of Classification Search
None
See application file for complete search history.

(56) References Cited

U.S. PATENT DOCUMENTS

| 8,614,932 | B1* | 12/2013 | Sasaki | G11B 5/314 369/13.17 |
| 8,619,514 | B1 | 12/2013 | Matsumoto | |
| 8,619,515 | B1 | 12/2013 | Matsumoto | |
| 8,619,516 | B1 | 12/2013 | Matsumoto | |
| 8,705,325 | B2 | 4/2014 | Matsumoto | |
| 8,705,327 | B2 | 4/2014 | Matsumoto | |
| 8,923,100 | B1 | 12/2014 | Wessel et al. | |
| 9,147,427 | B1 | 9/2015 | Lee et al. | |
| 9,202,488 | B2* | 12/2015 | Peng | G11B 5/4866 |
| 9,218,835 | B1 | 12/2015 | Sasaki et al. | |
| 9,251,830 | B1 | 2/2016 | Duda et al. | |
| 9,431,036 | B2 | 8/2016 | Vavra et al. | |
| 10,115,423 | B1 | 10/2018 | Gubbins et al. | |
| 10,121,496 | B1* | 11/2018 | Peng | G11B 5/314 |
| 10,249,326 | B1* | 4/2019 | Peng | G11B 13/08 |
| 10,748,572 | B1 | 8/2020 | Yang et al. | |
| 10,770,098 | B1* | 9/2020 | Peng | G11B 5/4866 |
| 10,811,035 | B1 | 10/2020 | Lee et al. | |
| 10,811,038 | B1* | 10/2020 | Peng | G11B 5/1878 |
| 10,839,830 | B1 | 11/2020 | Peng et al. | |
| 10,964,340 | B1* | 3/2021 | Chen | G11B 5/39 |
| 10,978,102 | B1* | 4/2021 | Lai | G11B 5/3133 |

(Continued)

*Primary Examiner* — Tan X Dinh
(74) *Attorney, Agent, or Firm* — Thomas R. Berthold

(57) ABSTRACT

A heat-assisted magnetic recording (HAMR) head has a gas-bearing slider that supports a a main magnetic pole, a near-field transducer (NFT) and a waveguide optically coupled to the NFT. Optically reflective side shields are located adjacent the cross-track sides of the waveguide at the slider's gas-bearing surface (GBS). The side shields may also be located adjacent the cross-track sides of the NFT and extend in the along-the-track direction to the write head's magnetic return pole. The cross-track gap width between a portion of the side shields adjacent the NFT at the GBS may be different from the cross-track gap width between a portion of the side shields adjacent the waveguide end at the GBS.

20 Claims, 13 Drawing Sheets

(56) References Cited

U.S. PATENT DOCUMENTS

| | | | |
|---|---|---|---|
| 11,056,135 B1* | 7/2021 | Peng | G11B 5/3116 |
| 2009/0052077 A1* | 2/2009 | Tanaka | G11B 5/314 |
| | | | 360/59 |
| 2012/0051195 A1* | 3/2012 | Shimizu | G11B 5/6088 |
| | | | 369/13.17 |
| 2015/0325261 A1* | 11/2015 | Yang | G11B 5/3133 |
| | | | 369/13.33 |
| 2017/0249962 A1* | 8/2017 | Peng | G11B 5/314 |
| 2018/0096702 A1* | 4/2018 | Staffaroni | G11B 5/3133 |
| 2019/0066722 A1* | 2/2019 | Maletzky | G11B 5/3133 |
| 2019/0378539 A1 | 12/2019 | Matsumoto et al. | |

\* cited by examiner

US 11,250,879 B1

HEAT-ASSISTED MAGNETIC RECORDING (HAMR) HEAD WITH OPTICALLY REFLECTIVE SHIELD MATERIAL ADJACENT THE WAVEGUIDE

TECHNICAL FIELD

This invention relates generally to a heat-assisted magnetic recording (HAMR) disk drive, in which data are written while the magnetic recording layer on the disk is at an elevated temperature, and more specifically to an improved HAMR head.

BACKGROUND

In conventional magnetic recording, thermal instabilities of the stored magnetization in the recording media can cause loss of recorded data. To avoid this, media with high magneto-crystalline anisotropy ($K_u$) are required. However, increasing $K_u$ also increases the coercivity of the media, which can exceed the write field capability of the write head. Since it is known that the coercivity of the magnetic material of the recording layer is temperature dependent, one proposed solution to the thermal stability problem is heat-assisted magnetic recording (HAMR), wherein high-$K_u$ magnetic recording material is heated locally during writing by the main magnetic pole to lower the coercivity enough for writing to occur, but where the coercivity/anisotropy is high enough for thermal stability of the recorded bits at the ambient temperature of the disk drive (i.e., the normal operating or "room" temperature of approximately 15-30° C.). In some proposed HAMR systems, the magnetic recording material is heated to near or above its Curie temperature. The recorded data is then read back at ambient temperature by a conventional magnetoresistive read head. HAMR disk drives have been proposed for both conventional continuous media, wherein the magnetic recording material is a continuous layer on the disk, and for bit-patterned media (BPM), wherein the magnetic recording material is patterned into discrete data islands or "bits".

One type of proposed HAMR disk drive uses a laser source and an optical waveguide coupled to a near-field transducer (NFT) for heating the recording material on the disk. A "near-field" transducer refers to "near-field optics", wherein the passage of light is through an element with sub-wavelength features and the light is coupled to a second element, such as a substrate like a magnetic recording medium, located a sub-wavelength distance from the first element. The NFT is typically located at the gas-bearing surface (GBS) of the gas-bearing slider that also supports the read/write head and rides or "flies" above the disk surface.

A NFT with a generally triangular or trapezoidal shaped output end is described in U.S. Pat. No. 8,705,327 B2. In this NFT an evanescent wave generated at a surface of the waveguide couples to surface plasmons excited on the surface of the NFT and a strong optical near-field is generated at the apex of the output end.

SUMMARY

It is desirable in HAMR to improve the optical efficiency, so the waveguide mode is efficiently converted to the optical near-field and light is more confined at the apex of the NFT. This will improve the thermal gradient in the recording layer, meaning there is a sharp drop in temperature at the edges of the bits being recorded. This will increase the areal data density and lower the laser power to reduce the power consumption of the laser.

In embodiments of this invention, optically reflective side shields are located adjacent the cross-track sides of the waveguide at the GBS. The side shields may also be located adjacent the cross-track sides of the NFT and extend in the along-the-track direction to the write head's magnetic return pole. The cross-track gap width between a portion of the side shields adjacent the NFT at the GBS may be different from the cross-track gap width between a portion of the side shields adjacent the waveguide end at the GBS.

For a fuller understanding of the nature and advantages of the present invention, reference should be made to the following detailed description taken together with the accompanying figures.

DETAILED DESCRIPTION

Figure 1:
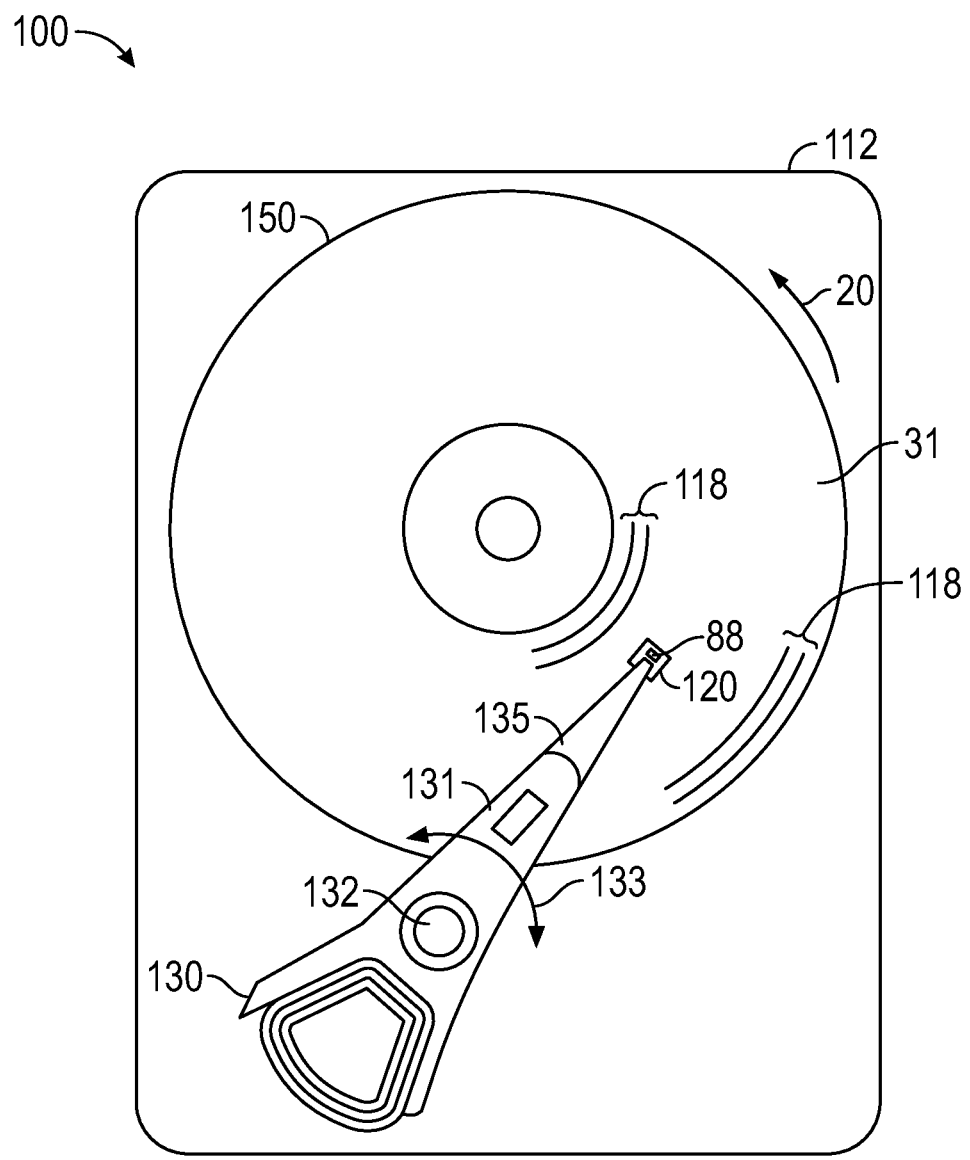
FIG. 1 is a top view of a heat-assisted magnetic recording (HAMR) disk drive according to an embodiment of the invention.

FIG. 1 is a top view of a heat-assisted recording (HAMR) disk drive 100 according to an embodiment of the invention. In FIG. 1, the HAMR disk drive 100 is depicted with a disk 150 with magnetic recording layer 31 of conventional continuous magnetic recording material arranged in radially-spaced circular tracks 118. Only a few representative tracks 118 near the inner and outer diameters of disk 150 are shown. However, instead of a conventional continuous magnetic recording layer, the recording layer may be a bit-patterned-media (BPM) layer with discrete data islands.

The drive 100 has a housing or base 112 that supports an actuator 130 and a drive motor for rotating the magnetic recording disk 150. The actuator 130 may be a voice coil motor (VCM) rotary actuator that has a rigid arm 131 and rotates about pivot 132 as shown by arrow 133. A head-suspension assembly includes a suspension 135 that has one end attached to the end of actuator arm 131 and a head carrier, such as a gas-bearing slider 120, attached to the other end of suspension 135. The suspension 135 permits the slider 120 to be maintained very close to the surface of disk 150 and enables it to "pitch" and "roll" on the bearing of gas (typically air or helium) generated by the disk 150 as it rotates in the direction of arrow 20. The slider 120 supports the HAMR head (not shown), which includes a magnetoresistive read head, an inductive write head, the near-field transducer (NFT) and optical waveguide. A semiconductor laser 88 with a wavelength of 780 to 980 nm may used as the HAMR light source and is depicted as being supported on the top of slider 120. Alternatively, the laser may be located on suspension 135 and coupled to slider 120 by an optical channel. As the disk 150 rotates in the direction of arrow 20, the movement of actuator 130 allows the HAMR head on the slider 120 to access different data tracks 118 on disk 150. The slider 120 is typically formed of a composite material, such as a composite of alumina/titanium-carbide ($Al_2O_3$/TiC). Only one disk surface with associated slider and read/write head is shown in FIG. 1, but there are typically multiple disks stacked on a hub that is rotated by a spindle motor, with a separate slider and HAMR head associated with each surface of each disk.

Figure 2:
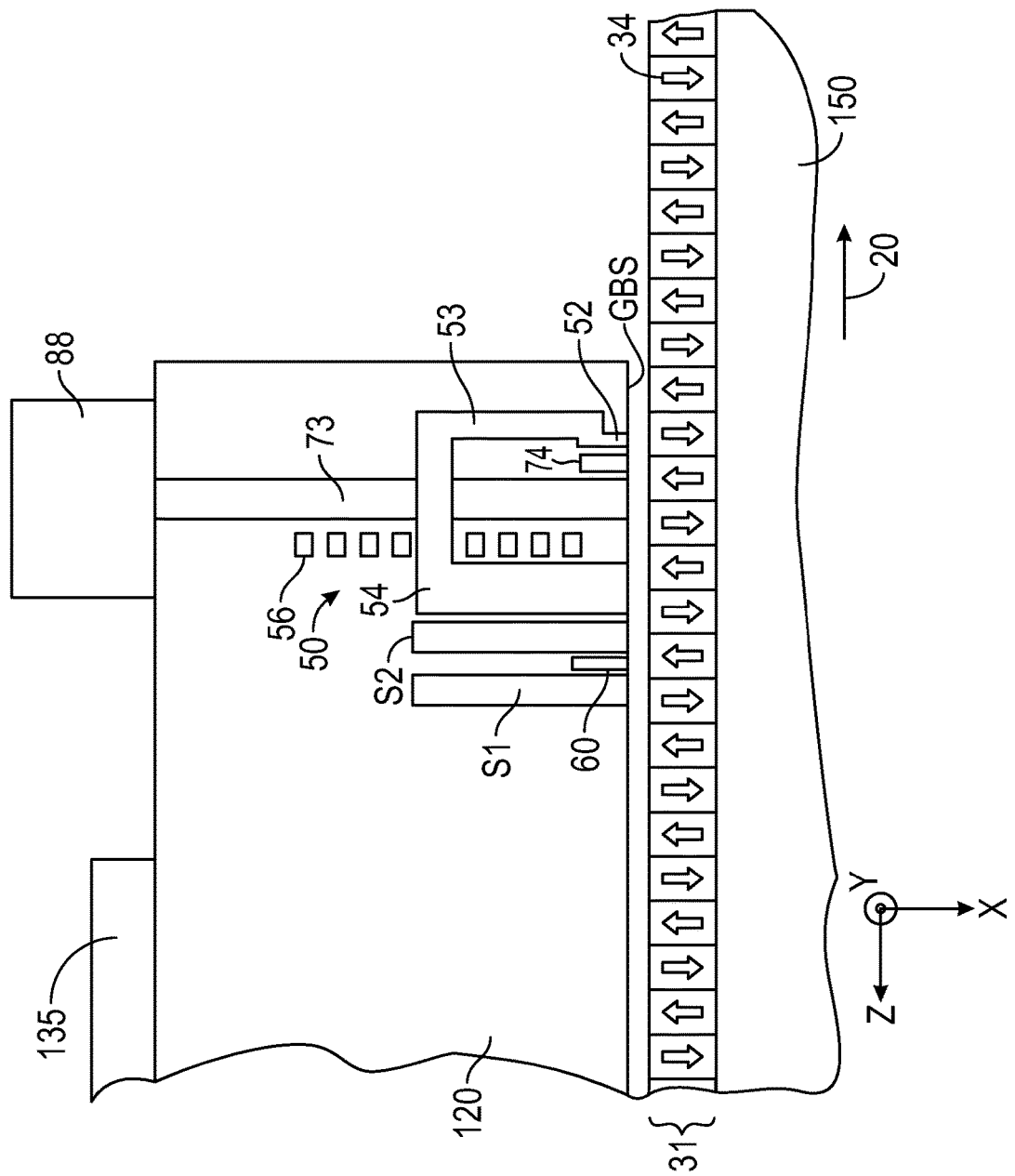
FIG. 2 is a side sectional view, not drawn to scale because of the difficulty in showing the very small features, of a gas-bearing slider for use in a HAMR disk drive and a portion of a HAMR disk according to the prior art.

In the following drawings, the X-axis denotes an axis perpendicular to the gas-bearing surface (GBS) of the slider, the Y-axis denotes a track width or cross-track axis, and the Z-axis denotes an along-the-track axis. FIG. 2 is a schematic cross-sectional view illustrating a configuration example of a HAMR head according to the prior art. In FIG. 2, the disk 150 is depicted with the recording layer 31 being a conventional continuous magnetic recording layer of magnetizable material with magnetized regions or "bits" 34. The gas-bearing slider 120 is supported by suspension 135 and has a GBS that faces the disk 150 and supports the magnetic write head 50, read head 60, and magnetically permeable read head shields S1 and S2. There is typically a protective overcoat (not shown), like diamond-like carbon (DLC), formed on the GBS, so the GBS is the surface directly below the protective overcoat. As used herein, the phrases "at the GBS" and "substantially at the GBS" mean precisely at the GBS, slightly protruding from the GBS or slightly recessed from the GBS. A recording magnetic field is generated by the write head 50 made up of a coil 56, a primary magnetic pole 53 for transmitting flux generated by the coil 56, a main pole 52 connected to the primary pole 53, and a return magnetic pole 54 coupled to the primary pole 53 and main pole 52. A magnetic field generated by the coil 56 is transmitted through the primary pole 53 to the main pole 52 arranged in a vicinity of an optical near-field transducer (NFT) layer 74. FIG. 2 illustrates the write head 50 with a well-known "pancake" coil 56, wherein the coil segments lie in substantially the same plane. However, alternatively the coil may be a well-known "helical" coil wherein the coil is wrapped around the primary magnetic pole 53. At the moment of recording, the recording layer 31 of disk 150 is heated by an optical near-field generated at the tip of NFT layer 74 and, at the same time, a region or "bit" 34 is magnetized and thus written onto the recording layer 31 by applying a recording magnetic field generated by the main pole 52.

A semiconductor laser 88 is mounted to the top surface of slider 120. An optical waveguide 73 for guiding light from laser 88 to the NFT layer 74 is formed inside the slider 120. Materials that ensure a refractive index of the waveguide 73 core material to be greater than a refractive index of the surrounding cladding material (not shown) may be used for the waveguide 73. For example, $Al_2O_3$ may be used as the cladding material and $TiO_2$, $T_2O_5$ and $SiO_xN_y$ as the core material. Alternatively, $SiO_2$ may be used as the cladding material and $Ta_2O_5$, $TiO_2$, $Nb_2O_5$, $SiO_xN_y$, or Ge-doped $SiO_2$ as the core material. The waveguide 73 that delivers light to NFT layer 74 is preferably a single-mode waveguide.

Figure 3A:
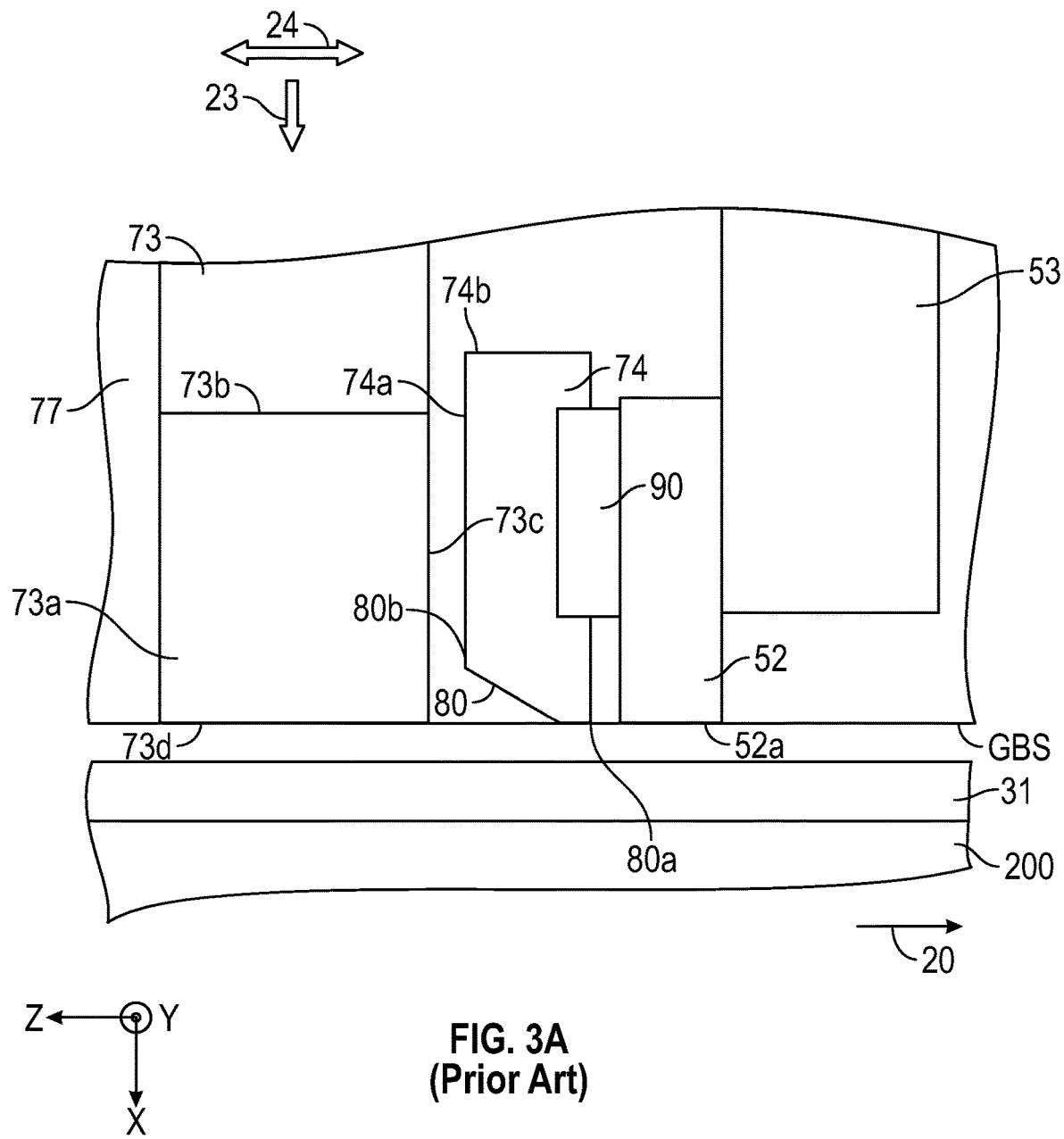
FIG. 3A is a side sectional view of the layers of material making up the main pole and primary pole, the near-field transducer (NFT) and the waveguide according to the prior art and shown in relation to the recording layer on the disk.
Figure 3B:
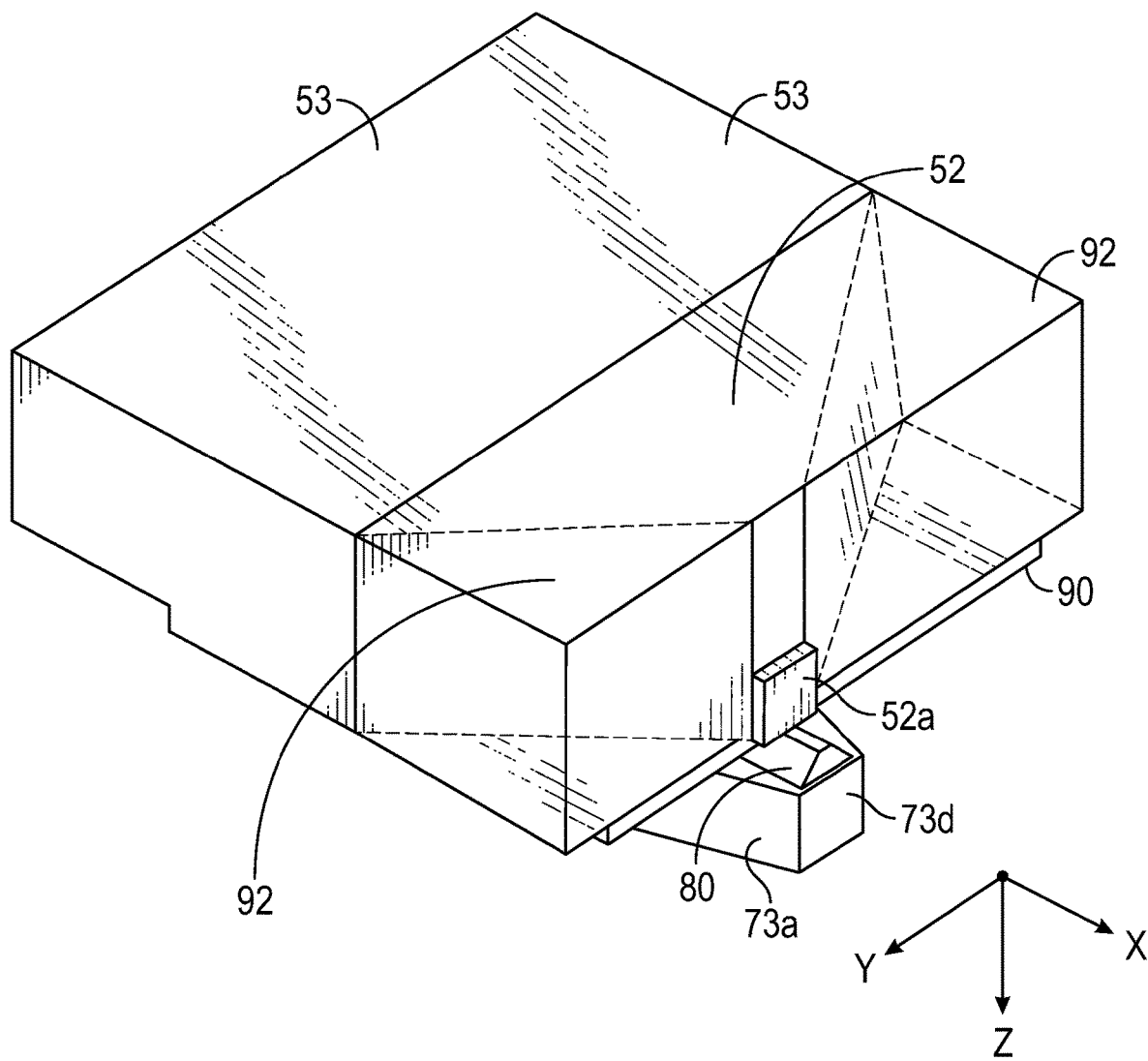
FIG. 3B is a perspective view of the main pole, primary pole, NFT, tapered waveguide and heat-sink material on the cross-track sides of the main pole according to the prior art.

FIG. 3A is a side sectional view of a prior art HAMR head and shows the layers of material making up the primary pole 53, main pole 52, NFT layer 74 and waveguide 73 and shown in relation to disk 150 with recording layer 31. The main pole 52 is typically a layer of high-moment material like FeCo and has a pole tip 52a at the GBS. The waveguide 73 is a layer of core material generally parallel to the main pole 52 layer with a length orthogonal to the GBS and may have a tapered portion 73a extending from a region 73b recessed from the GBS to the waveguide end 73d at the GBS. The waveguide 73 has surrounding cladding material 77 and a generally planar surface 73c that faces and is parallel to NFT layer 74. The NFT layer 74 is a conductive low-loss metal (preferably Au, but also Ag, Al, Cu, Rh, Ir or their alloys), is generally parallel to waveguide 73 layer and main pole 52 layer and is located between and spaced from the waveguide 73 layer and the main pole 52 layer. The NFT layer 74 has a surface 74a that faces and is spaced from waveguide surface 73c. The NFT layer 74 has an output tip 80 at the GBS. When light is introduced into the waveguide 73, an evanescent wave is generated at the surface 73c and couples to a surface plasmon excited on the surface 74a of NFT layer 74. Arrow 23 shows the direction of propagation of light in waveguide 73 and arrow 24 shows the direction of polarization of the light. The surface plasmon propagates to the NFT output tip 80. The output tip 80 has an apex 80a that faces the main pole tip 52a and a back edge 80b that faces the waveguide surface 73c. At the apex 80a an optical near-field spot is generated in the space at the GBS between the output tip apex 80a and the main pole tip 52a. The main pole tip 52a applies a magnetic field at the optical spot. A thermal shunt 90 of material with high thermal conductivity like Au, Ag or Cu may be located between NFT layer 74 and main pole 52 to allow heat to be transferred from the optical spot to heat-sink material located on the cross-track sides of main pole 52. A thermal shunt is described in U.S. Pat. No. 8,619,516 B1, which is assigned to the same assignee as this application. FIG. 3B is a perspective view of a prior art HAMR head and shows heat-sink material 92 in contact with thermal shunt 90, as well as the primary pole 53, the main pole 52, the NFT output tip 80 and the waveguide end 73d.

Figure 4A:
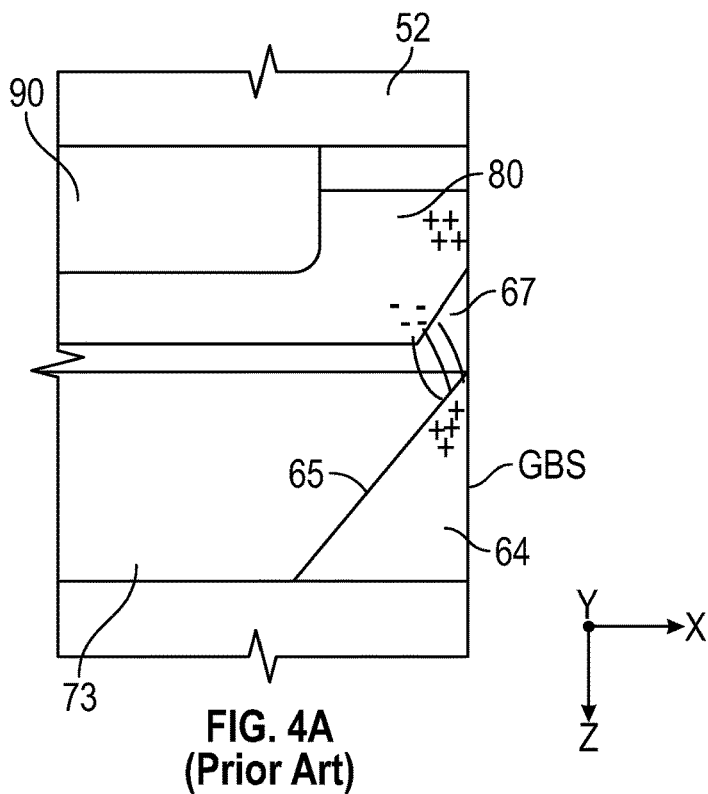
FIG. 4A is a sectional view through the X-Z plane and FIG. 4B is a perspective sectional view through the X-Z plane of a prior art HAMR head with an optically reflective shield adjacent the cross-track sides of only the NFT.
Figure 4B:
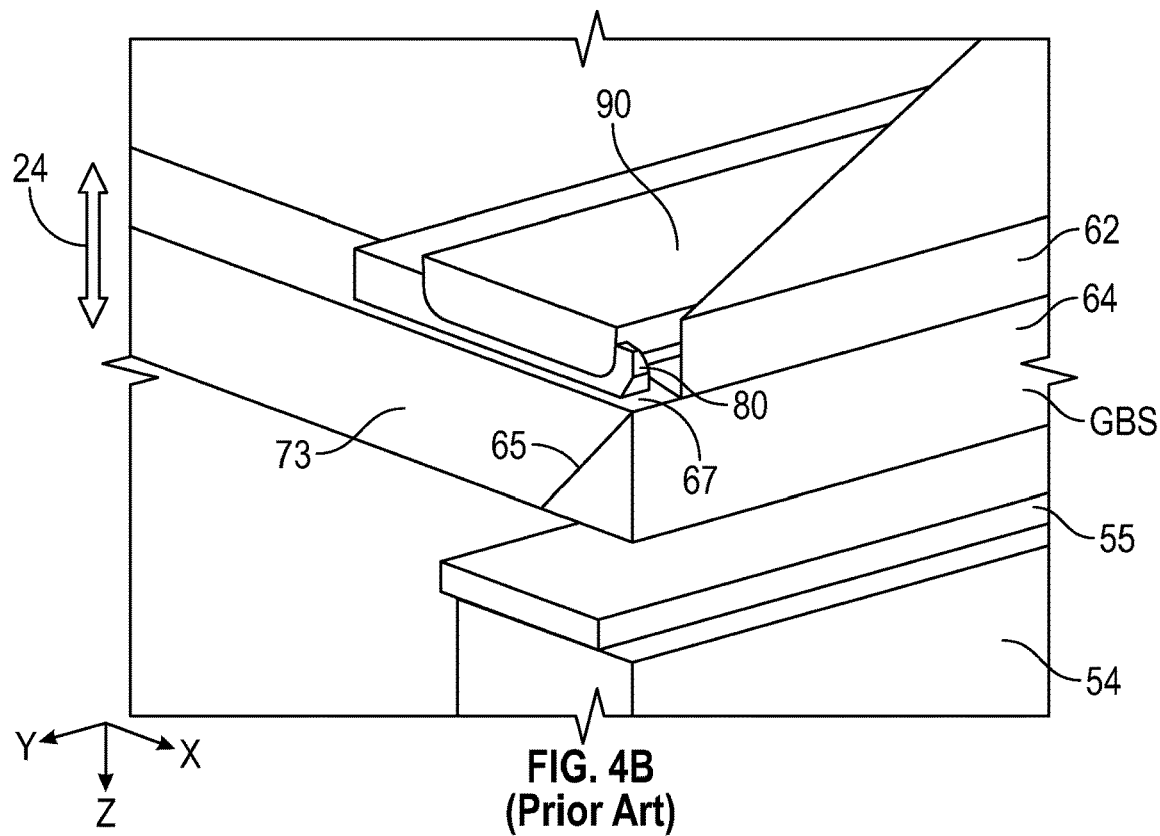

FIG. 4A is a sectional view through the X-Z plane and FIG. 4B is a perspective sectional view through the X-Z plane of a prior art HAMR head with an optically reflective shield adjacent the cross-track sides of only the NFT. The optically reflective shield 62 is formed adjacent the cross-track sides of NFT output tip 80. An additional optically reflective shield 64 is located below (in the +Z direction) the NFT tip 80 and between the waveguide 73 and the GBS. FIG. 4B also shows return pole 54 and mirror layer 55 between optical shield 64 and return pole 54. The mirror layer 55 is formed of a highly reflective material like Au and improves the thermal gradient and the optical efficiency, which results in lower laser power. The normal vector of the slanted surface 65 of the optical shield 64 is in the X-Z plane. The slanted surface 65 faces the NFT tip 80 and increases the along-the-track (Z direction) distance between the optical shield 64 and the NFT tip 80 away from the GBS. To excite surface plasmon on the NFT tip 80, the waveguide mode has to be the transverse magnetic (TM) mode where the light polarization is in the Z direction (arrow 24). In the prior art of FIGS. 4A-4B, the NFT tip 80 and optical shield 64 are located along the direction of light polarization. This causes a strong interaction between the charges in the NFT tip 80 and the charges in the optical shield 64, as shown in FIG. 4A. This results in a strong background light generated in the gap 67 between the NFT tip 80 and the optical shield 64. It also results in a large increase of required laser power. Because the optical shield 64 is located under (the +Z direction) the NFT tip 80, it also causes strong light absorption and thus a large increase in the temperature in the optical shield 64, which is undesirable for reliability. U.S. Pat. No. 8,705,327 B2 describes a HAMR head with an optically reflective shield located below the NFT. U.S. Pat. No. 10,115,423 B1 describes a HAMR head with an optically reflective shield located below the NFT and adjacent the cross-track sides of only the NFT similar to that depicted in FIGS. 4A-4B.

Figure 5A:
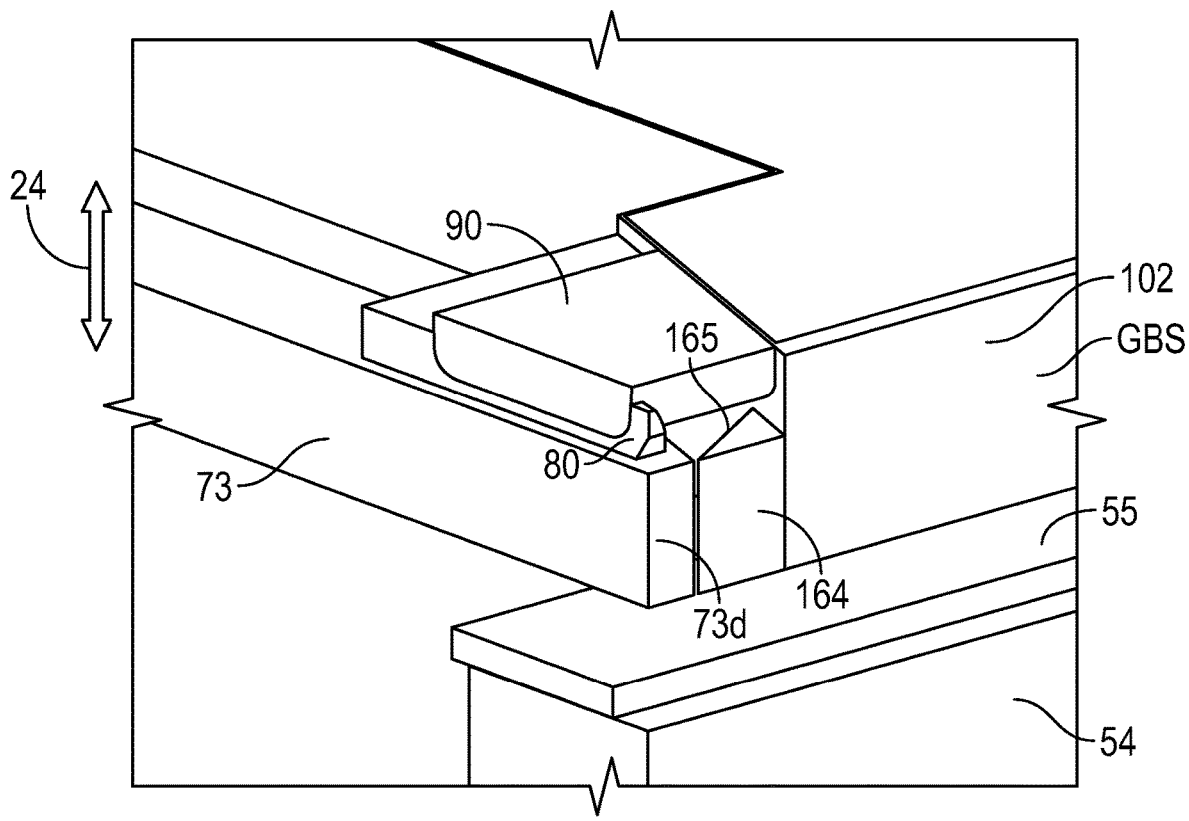
FIG. 5A is a perspective sectional view through the X-Z plane.
Figure 5A:
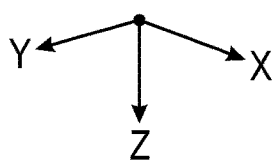
Figure 5B:
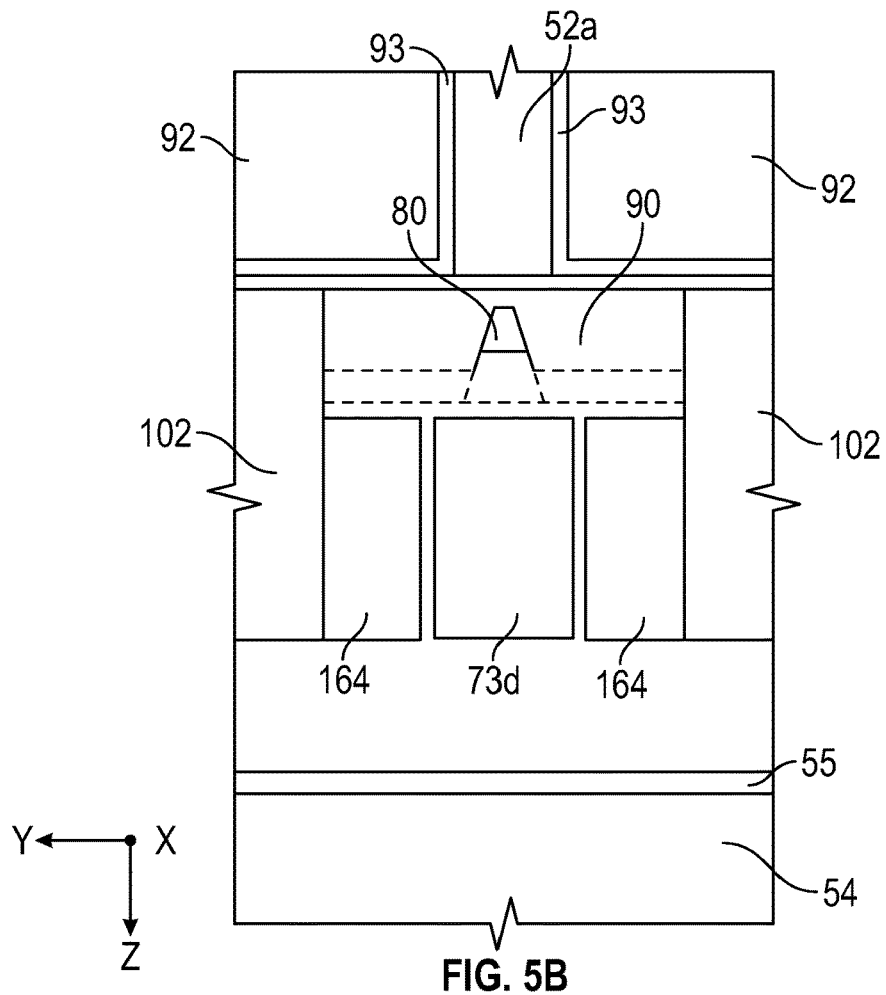
FIG. 5B is a view from the gas bearing surface (GBS)
Figure 5C:
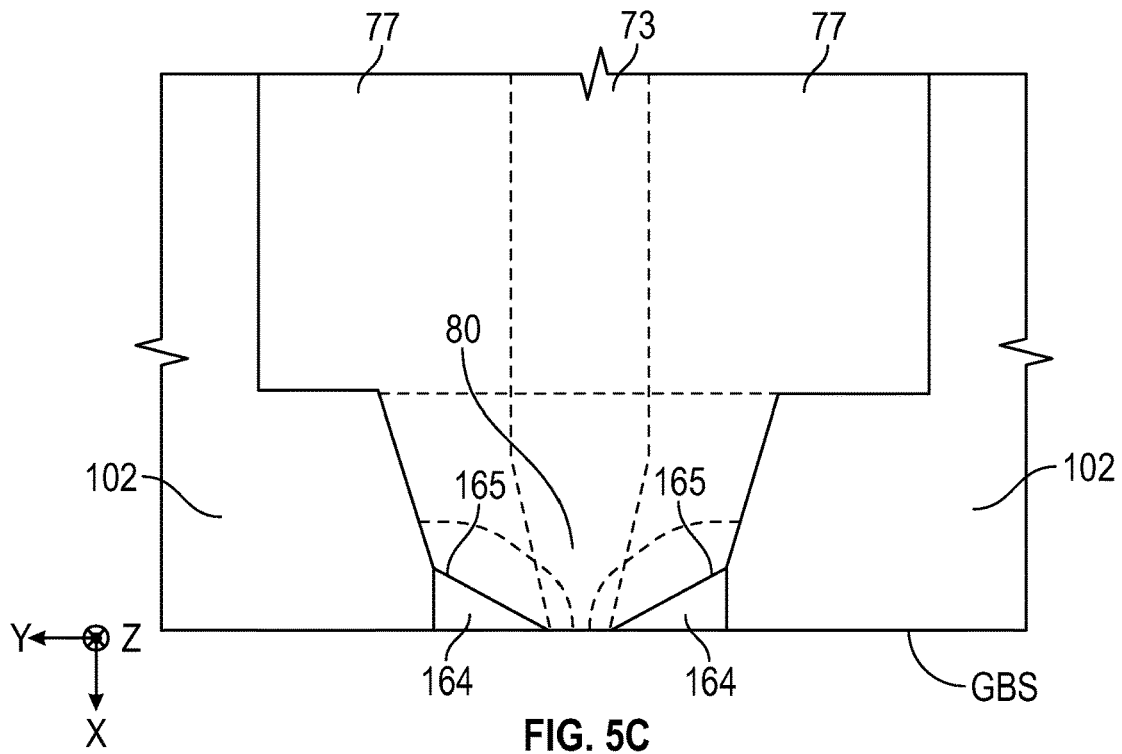
FIG. 5C is sectional view through the X-Y plane of a HAMR head according to an embodiment of the invention.

FIG. 5A is a perspective sectional view through the X-Z plane, FIG. 5B is a view from the GBS, and FIG. 5C is sectional view through the X-Y plane and of a HAMR head according to an embodiment of the invention. FIG. 5B also depicts an optional diffusion barrier 93, which is known in the prior art, if the heat-sink material 92 includes an element, like Cu or Au, that may diffuse into the magnetic material of main pole 52. The optically reflective side shield 164 is on the cross-track sides (the Y direction) of the waveguide 73. The normal vector of the slanted surface 165 is in the X-Y plane, and the slanted surface 165 faces the side of the waveguide 73. The cross-track distance between the side shields 164 and the NFT tip 80 increases in the –X direction away from the GBS. Unlike the prior art (FIG. 4B), the NFT tip 80 and side shields 164 are not located collinearly along the light polarization direction (arrow 24), and the space under the NFT (+Z direction) is open. Therefore, the interaction between the NFT tip 80 and the optically reflective side shields 164 is weak, and the background light is not generated between the NFT tip 80 and the side shields 164. The embodiment of FIGS. 5A-5C also include optional side heat sinks 102 adjacent the cross-track sides of the side shields 164.

The side shields may be formed of Au, Rh, Ir, Cu, Ag, Al, AlN, TiN, Ru, Cr, Pt, Ti, Fe, Co, Ni or Pd, or alloys of one or more of these materials. It is preferable to use material with a high reflectivity such as Au, Rh, Ir, Cu, Ru, Pd, Cr, Ag, TiN and their alloys. By using the high reflectivity material, the optical efficiency is improved, which results in lower laser power and lower temperature rise at the NFT tip 80 and the side shields 164. Ferromagnetic material, like NiFe or CoFe, may also be used for the side shield material and confines not only the optical field but also the magnetic field, which helps to reduce adjacent track interference. The side shields can be formed of multiple layers. For example, the high reflectivity material can be used only on the surface of the side shields, and other material can be used for the inside of the side shields to improve mechanical robustness of the side shields that are exposed at the GBS. Heat sinks 102 may be formed on the cross-track sides of the side shields 164. The side shields absorb light and this causes an increase in the temperature of the NFT. By forming the heat sinks adjacent the side shields, the NFT temperature can be reduced. The heat sinks 102 may be formed of Cu, Au, Ag, Al, W, Ru, Cr, SiN, AlN, TiC, SiC, Be, Fe, FeCo or NiFe, or alloys of one or more of these materials, with high thermal conductivity material, like Cu or Au, being preferred. The high reflectivity layer of the side shields can be extended to the sides of the heat sinks.

Figure 6A:
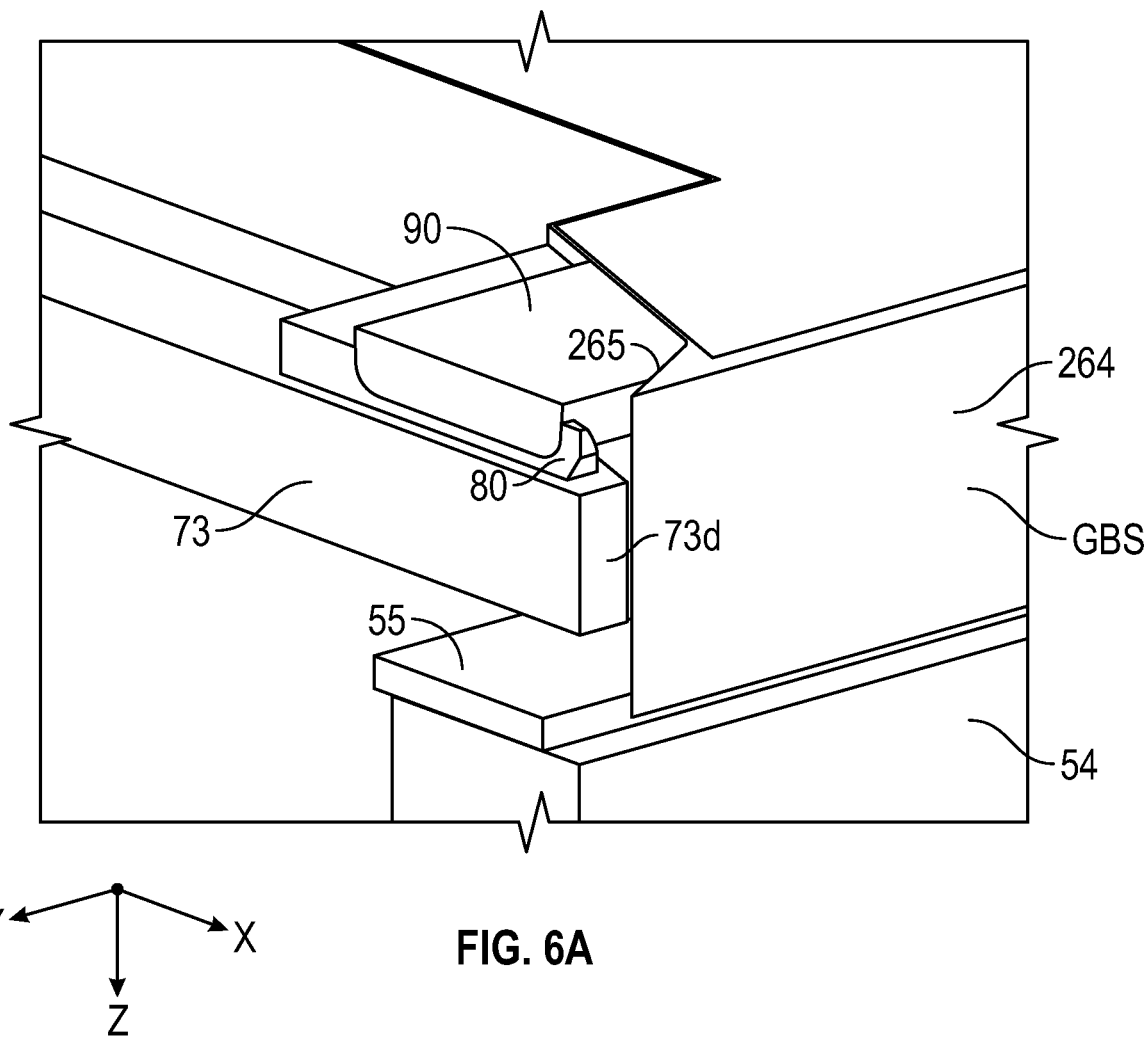
FIG. 6A is a perspective sectional view through the X-Z plane.
Figure 6B:
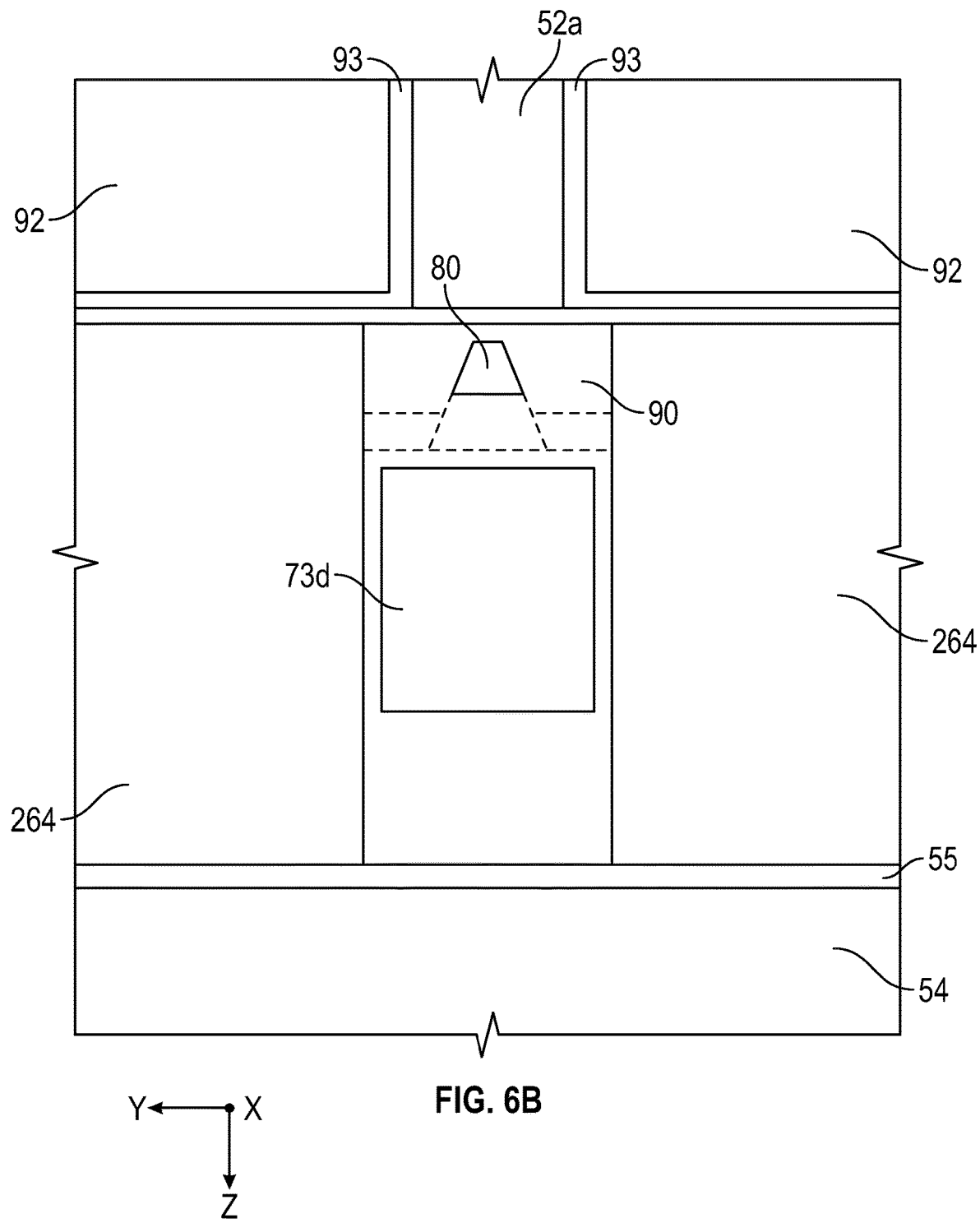
FIG. 6B is a view from the GBS of another embodiment of the invention.

FIGS. 5A-5B depict an embodiment where the side shields 164 are adjacent only the waveguide 73 and do not extend in the +Z direction toward the return pole 54. FIG. 6A is a perspective sectional view through the X-Z plane, and FIG. 6B is a view from the GBS, of another embodiment of the invention. In this embodiment the side shields 264 with slanted surface 265 are also adjacent the cross-track sides of the NFT tip 80 and extend in the +Z direction toward the return pole 54. The side shields 264 may be in contact with the optional mirror layer 55, or with the return pole 54. If the side shields are located only adjacent the NFT tip 80, as in the prior art of FIG. 4B, the thermal gradient is not improved. However, extending the side shields to be adjacent the waveguide 73, as in FIG. 6A, computer simulation has shown a 10% improvement in thermal gradient. By extending the side shields to the optical mirror layer 55 or the return pole 54, the NFT temperature can be reduced for better heat sinking.

Figure 7A:
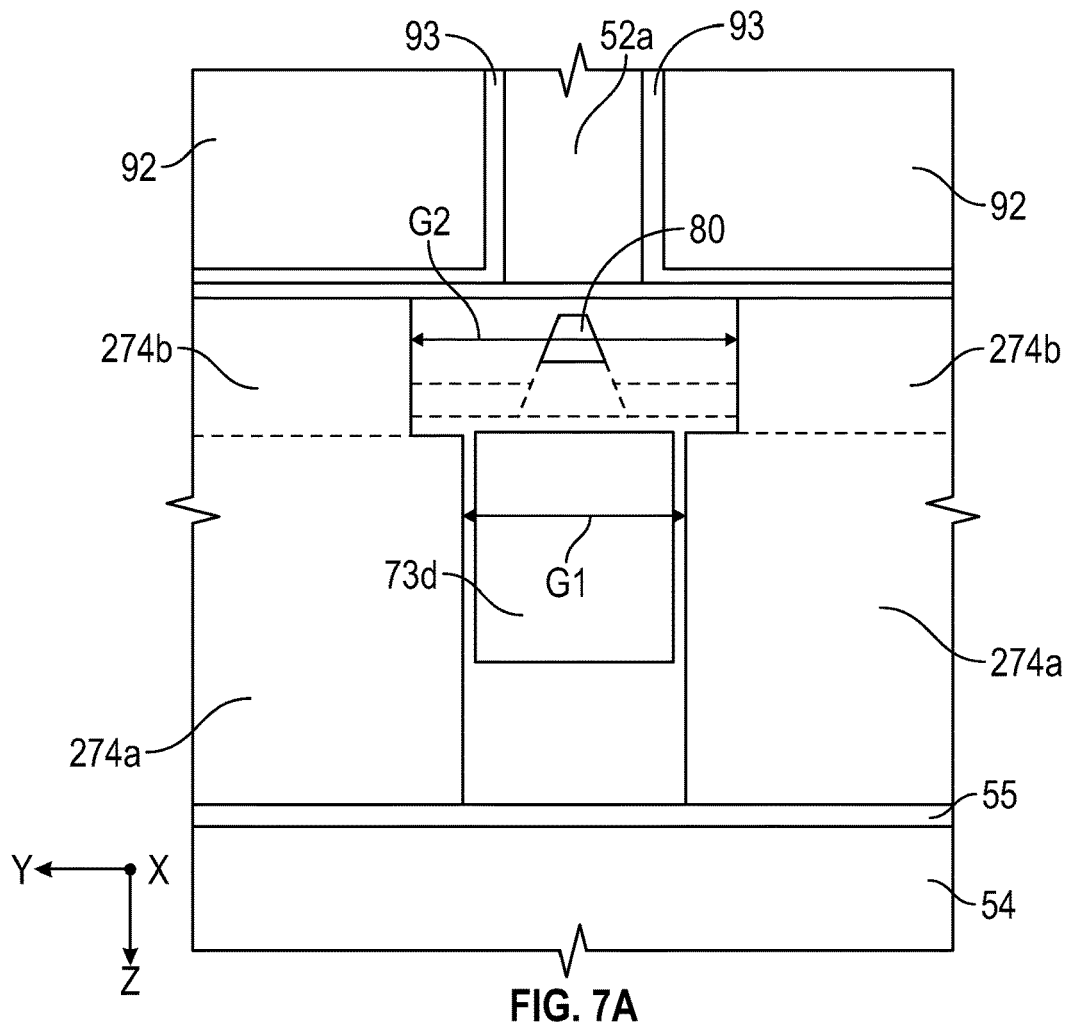
FIG. 7A is a view from the GBS.
Figure 7B:
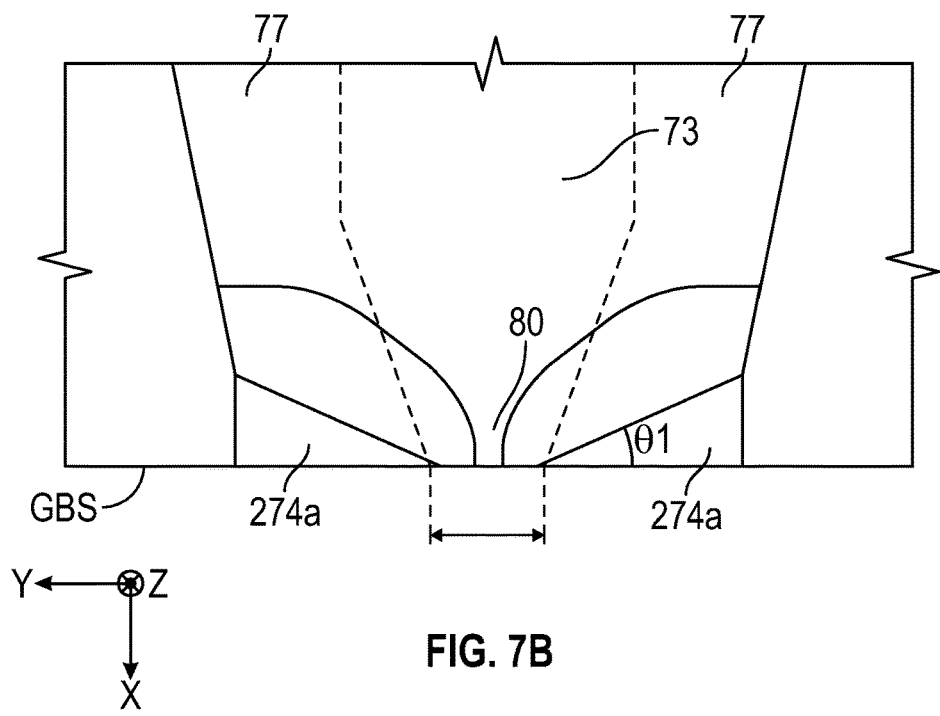
FIG. 7B is sectional view through the X-Y plane of a HAMR head according to an embodiment of the invention showing the cross-track gap width between the side shields.

FIG. 7A is a view from the GBS, and FIG. 7B is sectional view through the X-Y plane of a HAMR head according to an embodiment of the invention showing the cross-track gap width between the side shields. The cross-track gap width G1 between the portion of the side shields 274a adjacent the waveguide end 73d at the GBS and the cross-track gap width G2 of the portion of the side shields 274b adjacent the NFT tip 80 at the GBS can be the same, or different as shown in FIG. 7A. For example, G2 can be about 300 nm and G1 can be about 150 nm. The narrower the gap width G1 the higher the thermal gradient, but the required laser power and the NFT temperature increases when the gap width is reduced. The optimum width G1 is between about 100 to 300 nm to obtain a balance of performance and reliability. Also, the waveguide end 73d can be slightly recessed from the GBS and the side shields 274a can overlap the waveguide end 73d, in which case G1 would be less than the cross-track width of waveguide end 73d.

Figure 8A:
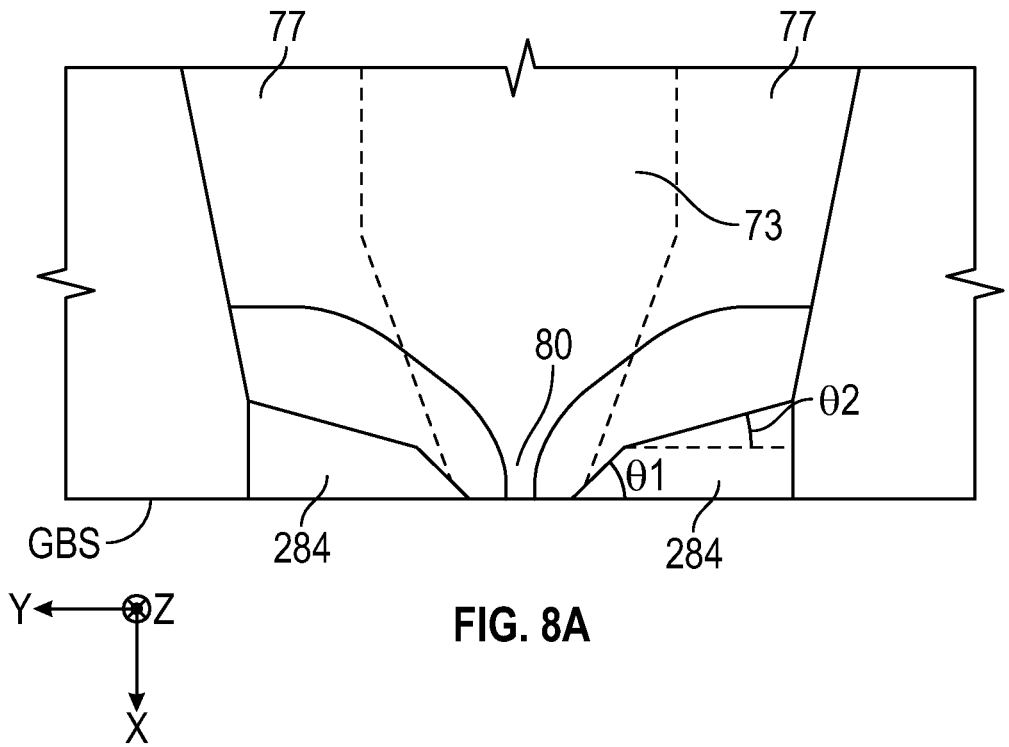
FIG. 8A is sectional view through the X-Y plane of a HAMR head according to an embodiment of the invention showing multiple taper angles for the side shields.
Figure 8B:
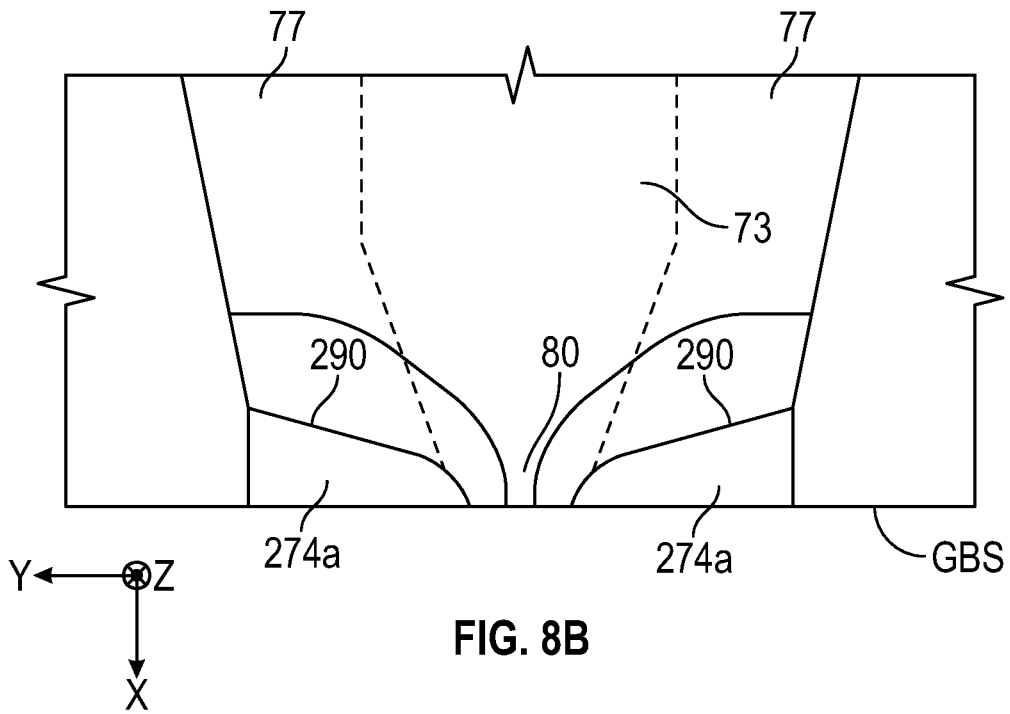
FIG. 8B is sectional view through the X-Y plane of a HAMR head according to an embodiment of the invention showing a curved surface for the side shields.

FIG. 7B also shows the taper angle $\theta 1$ between the side shields 274a and the GBS. The taper angle $\theta 1$ is preferably between about 10 and 45 degrees. When the taper angle $\theta 1$ is large, the optical efficiency of the NFT decreases due to optical interaction between the NFT and the side shields, and the temperature of the NFT is increased. To reduce the interaction between the NFT and the side shields, a small angle $\theta 1$ is preferred. However, a small angle $\theta 1$ makes it difficult to precisely control the cross-track gap width of the side shields during manufacturing. To solve this issue there can be multiple angles between the side shields and the GBS, as shown in FIG. 8A, which is sectional view through the X-Y plane. For example, the first angle $\theta 1$ at the tip near the waveguide end can be increased, and a second angle $\theta 2$ between the side shields and a plane parallel to but recessed from the GBS can be smaller than $\theta 1$. The taper angle can also be gradually changed, resulting in the side shields having a curved surface 290 in the cross-track direction from the GBS to a region recessed from the GBS, as shown in FIG. 8B, which is a sectional view through the X-Y plane. The taper angle θ1 of the portion of the side shields adjacent the waveguide end can be different from the taper angle of the portion of the side shields adjacent the NFT. For example, the taper angle of the portion of the side shields adjacent the waveguide end can be 45 deg. and the taper angle of the portion of the side shields adjacent the NFT can be 30 deg.

Figure 9:
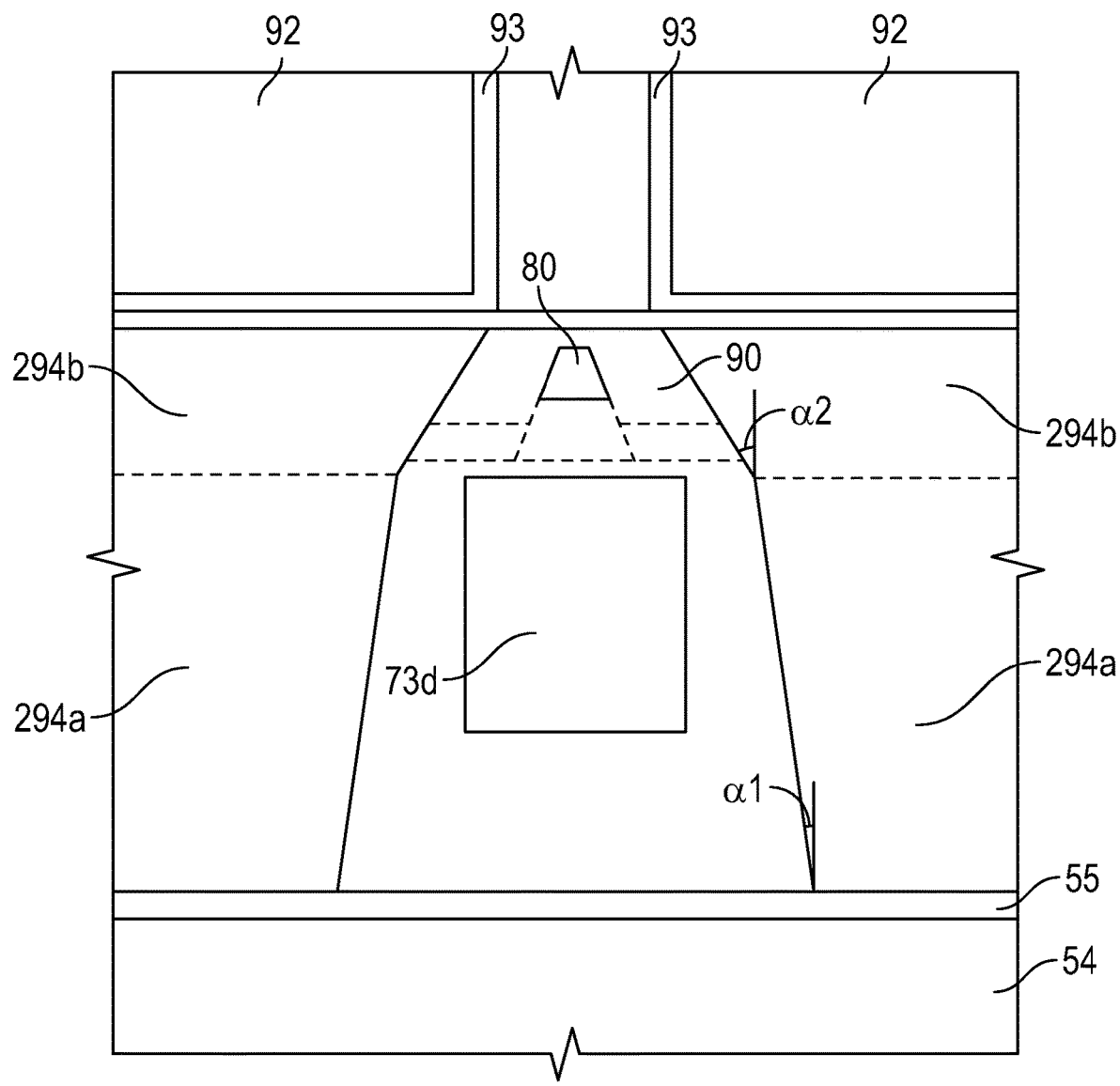
FIG. 9 is a GBS view of a HAMR head according to an embodiment of the invention showing the side shields non-parallel to the cross-track side edges of the waveguide end.

In the embodiments depicted in FIGS. 5B, 6B and 7A, the side shields are parallel to the cross-track side edges of the waveguide end 73d. However, the side shields can have a wall angle α1 relative to the cross-track side edges of the waveguide end 73d so as to be non-parallel to the cross-track side edges of the waveguide end 73d, as shown in FIG. 9. The wall angle α1 of the side shield portions 294a relative to the side edges of the waveguide end 73d can be different from the wall angle α2 of side shield portions 294b relative to the sides of the NFT tip 80. In this embodiment, the wall angles α1 and α2 are positive, but either α1 or α2, or both α1 and α2 can be negative.

Figure 10:
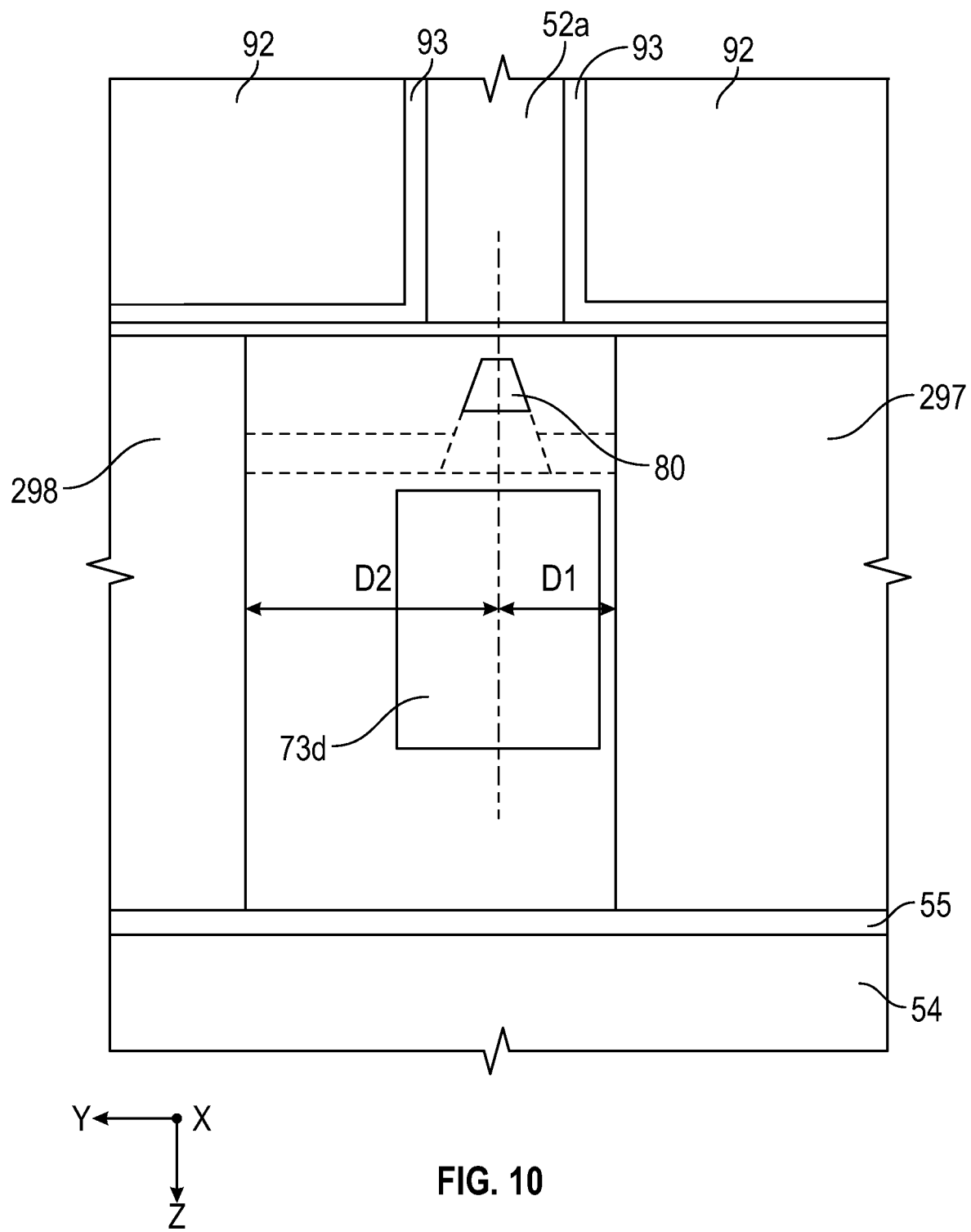
FIG. 10 is a GBS view of a HAMR head according to an embodiment of the invention suitable for shingled magnetic recording (SMR).

FIG. 10 is a view from the GBS of an embodiment for shingled magnetic recording (SMR). In SMR a new data track is written to overlap part of the previously written track, leaving the previous track narrower and thus allowing for higher track density. Thus in SMR, one side of the write head writes that portion of the data track that is later overwritten, so the other side of the write head can be referred to as the recording side. The distance between the centerline of the NFT tip 80 and waveguide end 73d and the side shield 297 on one side (D1) may be smaller than the distance between the centerline and the side shield 298 on the other side (D2). By reducing the distance D1 between NFT tip 80 on the side used for recording, the thermal gradient can be increased but the NFT temperature increases. By increasing the distance D2 the NFT temperature can be reduced. As an alternative embodiment for SMR the side shield on the non-recording side can be removed so that there is a side shield only on the side used for recording. In FIG. 10, the NFT tip 80 has an apex wall angle, which is the angle the NFT side edge makes with the X-Z plane. The upper apex wall angle, the portion nearest main pole end 52a, can be different form the lower apex wall angle, the portion nearest waveguide end 73d. For SMR, either the upper or lower apex wall angle, or both, on the side close to the side shield 297 (the recording side) can be made smaller than the NFT apex wall angle on the side 298. The smaller the apex wall angle, the higher the thermal gradient. The small apex wall angle also makes it possible to reduce the distance between the NFT tip 80 and the side shield 297 without increasing the optical interaction between the NFT and the side shield. It increases the thermal gradient without reducing the optical efficiency. The small apex wall angle increases the NFT temperature, but if the small angle is only on the side used for recording, the increase in NFT temperature can be minimized.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

The invention claimed is:

1. A heat-assisted magnetic recording (HAMR) head for writing to a magnetic recording layer on a magnetic recording disk comprising:
a gas-bearing slider having a gas-bearing surface (GBS) for facing the magnetic recording layer on the disk, the GBS having an along-the-track axis and a cross-track axis orthogonal to the along-the-track axis;
a main pole on a surface substantially orthogonal to the GBS and having an output end substantially at the GBS;
a near-field transducer (NFT) on the slider oriented substantially parallel to the main pole, the NFT having an output tip substantially at the GBS aligned with the main pole output end in the along-the-track direction;
an optical waveguide on the slider for optical coupling with the NFT, the waveguide having a length generally orthogonal to the GBS and an end near the GBS; and
an optically reflective side shield adjacent each side of the cross-track sides of the NFT and adjacent each side of the cross-track sides of the waveguide end, wherein the cross-track gap width between the side shields adjacent the NFT at the GBS is different from the cross-track gap width between the side shields adjacent the waveguide end at the GBS.

2. The HAMR head of claim 1 wherein the cross-track gap width between the side shields at the GBS is between about 100 and 300 nm.

3. A heat-assisted magnetic recording (HAMR) head for writing to a magnetic recording layer on a magnetic recording disk comprising:
a gas-bearing slider having a gas-bearing surface (GBS) for facing the magnetic recording layer on the disk, the GBS having an along-the-track axis and a cross-track axis orthogonal to the along-the-track axis;
a main pole on a surface substantially orthogonal to the GBS and having an output end substantially at the GBS;
a near-field transducer (NFT) on the slider oriented substantially parallel to the main pole, the NFT having an output tip substantially at the GBS aligned with the main pole output end in the along-the-track direction;
an optical waveguide on the slider for optical coupling with the NFT, the waveguide having a length generally orthogonal to the GBS and an end near the GBS;
an optically reflective side shield adjacent each side of the cross-track sides of the waveguide end; and
a return pole on a surface substantially orthogonal to the GBS, the return pole being coupled to the main pole and having an end substantially at the GBS, and wherein the waveguide end is located between the main pole and the return pole and the side shields extend in the along-the track direction from the waveguide end toward the return pole.

4. The HAMR head of claim 3 wherein the side shields are substantially in contact with the return pole.

5. The HAMR head of claim 3 further comprising a layer of NFT mirror material consisting essentially of Au between the side shields and the return pole and wherein the sides shields are substantially in contact with the NFT mirror layer.

6. A heat-assisted magnetic recording (HAMR) head for writing to a magnetic recording layer on a magnetic recording disk comprising:
a gas-bearing slider having a gas-bearing surface (GBS) for facing the magnetic recording layer on the disk, the GBS having an along-the-track axis and a cross-track axis orthogonal to the along-the-track axis;

a main pole on a surface substantially orthogonal to the GBS and having an output end substantially at the GBS;

a near-field transducer (NFT) on the slider oriented substantially parallel to the main pole, the NFT having an output tip substantially at the GBS aligned with the main pole output end in the along-the-track direction;

an optical waveguide on the slider for optical coupling with the NFT, the waveguide having a length generally orthogonal to the GBS and an end near the GBS; and an optically reflective side shield adjacent each side of the cross-track sides of the waveguide end, wherein the side shields have a first taper angle between the side shields and the GBS, wherein the first taper angle is between about 10 and 45 degrees, wherein the side shields have a second taper angle between the side shields and a plane parallel to but recessed from the GBS, and wherein the second taper angle is different from the first taper angle.

7. The HAMR head of claim 3 wherein the side shields have a curved surface in the cross-track direction from the GBS to a region recessed from the GBS.

8. The HAMR head of claim 3 wherein the side shields are non-parallel to the cross-track side edges of the waveguide end.

9. The HAMR head of claim 3 further comprising heat sink material adjacent the cross-track sides of the side shields.

10. The HAMR head of claim 9 wherein the heat sink material is selected from Cu, Au, Ag, Al, W, Ru, Cr, SiN, AlN, TiC, SiC, Be, Fe, FeCo and NiFe.

11. The HAMR head of claim 3 wherein the side shields are formed of a material selected from one or more of Au, Rh, Ir, Cu, Ag, Al, AlN, TiN, Ru, Cr, Pt, Ti, Fe, Co, Ni and Pd.

12. The HAMR head of claim 3 wherein the side shields are formed of a ferromagnetic material.

13. The HAMR head of claim 3 wherein the side shields are formed of multiple layers.

14. A heat-assisted recording (HAMR) disk drive comprising:
   the HAMR head of claim 3 further comprising a magnetoresistive read head on the slider;
   a laser for directing light to the waveguide; and
   a magnetic recording disk having a magnetic recording layer.

15. A heat-assisted magnetic recording (HAMR) head for writing to a magnetic recording layer on a magnetic recording disk comprising:
   a gas-bearing slider having a gas-bearing surface (GBS) for facing the magnetic recording layer on the disk, the GBS having an along-the-track axis and a cross-track axis orthogonal to the along-the-track axis;
   a main pole on a surface substantially orthogonal to the GBS and having an output end substantially at the GBS;
   a near-field transducer (NFT) on the slider oriented substantially parallel to the main pole, the NFT having an output tip substantially at the GBS aligned with the main pole output end in the along-the-track direction;
   an optical waveguide on the slider for optical coupling with the NFT, the waveguide having a length generally orthogonal to the GBS and an end near the GBS;
   at least one optically reflective side shield adjacent a cross-track side of the NFT and waveguide end; and
   a return pole on a surface substantially orthogonal to the GBS, the return pole being coupled to the main pole and having an end substantially at the GBS, and wherein the waveguide end is located between the main pole and the return pole in the along-the-track direction and the at least one side shield is located between the main pole and the return pole in the along-the-track direction and extends in the along-the track direction beyond the waveguide end toward the return pole.

16. The HAMR head of claim 15 wherein there is a side shield on each cross-track side of the NFT and waveguide end.

17. The HAMR head of claim 16 wherein one side shield is spaced from the waveguide end a greater distance than the spacing between the other side shield and the waveguide end.

18. The HAMR head of claim 16 further comprising heat sink material adjacent the cross-track sides of the side shields.

19. The HAMR head of claim 16 wherein the cross-track gap width between a portion of the side shields adjacent the NFT at the GBS is different from the cross-track gap width between a portion of the side shields adjacent the waveguide end at the GBS.

20. A heat-assisted recording (HAMR) disk drive comprising:
   the HAMR head of claim 15 further comprising a magnetoresistive read head on the slider;
   a laser for directing light to the waveguide; and
   a magnetic recording disk having a magnetic recording layer.

* * * * *